(12) United States Patent
Berrocal et al.

(10) Patent No.: US 10,404,010 B2
(45) Date of Patent: Sep. 3, 2019

(54) MODULAR PIN AND SOCKET ELECTRICAL CONNECTOR ASSEMBLY

(71) Applicant: ATI Industrial Automation, Inc., Apex, NC (US)

(72) Inventors: William G. Berrocal, Holly Springs, NC (US); Paul Luczka, Clayton, NC (US)

(73) Assignee: ATI INDUSTRIAL AUTOMATION, INC., Apex, NC (US)

( * ) Notice: Subject to any disclaimer, the term of this patent is extended or adjusted under 35 U.S.C. 154(b) by 47 days.

(21) Appl. No.: 15/583,111

(22) Filed: May 1, 2017

(65) Prior Publication Data

US 2018/0316139 A1    Nov. 1, 2018

(51) Int. Cl.
| | | |
|---|---|---|
| *H01R 13/64* | (2006.01) | |
| *B21D 39/03* | (2006.01) | |
| *B23P 11/00* | (2006.01) | |
| *B23B 31/16* | (2006.01) | |
| *H01R 13/24* | (2006.01) | |
| *H01R 13/631* | (2006.01) | |
| *H01R 13/426* | (2006.01) | |
| *B25J 15/04* | (2006.01) | |
| *B25J 19/00* | (2006.01) | |

(52) U.S. Cl.
CPC ............ *H01R 13/631* (2013.01); *B25J 15/04* (2013.01); *B25J 19/0033* (2013.01); *H01R 13/426* (2013.01)

(58) Field of Classification Search
CPC . H01R 2103/00; H01R 9/0521; H01R 13/622
USPC ................ 439/271, 322, 349, 700, 814, 891
See application file for complete search history.

(56) References Cited

U.S. PATENT DOCUMENTS

| | | | | | |
|---|---|---|---|---|---|
| 5,174,772 | A * | 12/1992 | Vranish | .................... | B25J 15/04 439/131 |
| 5,188,547 | A * | 2/1993 | Dixon | .................... | H01R 13/04 439/886 |
| 5,797,177 | A * | 8/1998 | Simmons | ............. | H01R 43/205 29/739 |
| 6,116,966 | A * | 9/2000 | Little | ................... | B25J 19/0025 439/700 |
| 6,233,805 | B1 * | 5/2001 | Burgholzer | ............ | H01R 43/22 29/278 |
| 6,533,594 | B1 * | 3/2003 | Kurup | .................. | B23K 11/362 439/191 |
| 7,549,885 | B1 * | 6/2009 | Oh | ..................... | H01R 13/6215 439/247 |

(Continued)

*Primary Examiner* — Abdullah A Riyami
*Assistant Examiner* — Thang H Nguyen
(74) *Attorney, Agent, or Firm* — Coats & Bennett, PLLC

(57) ABSTRACT

A modular approach to an electrical power and/or signal passing utility module is presented. A universal receptacle is fixedly disposed in bores in both of first and second signal connector blocks. A threaded socket member and a nonconductive guide bushing are installed, as needed, in receptacles in the first block, and a threaded pin member is installed in corresponding receptacles in the second block. The nonconductive guide bushing insulates the sockets, and guides pin posts into the socket as the two blocks abut. A compliant member such as an o-ring provides compliance of the socket and pin assemblies in the signal connector blocks, making the assemblies self-aligning. The socket and pin assemblies are field-replaceable by use of a simple tool.

38 Claims, 10 Drawing Sheets

(56) References Cited

U.S. PATENT DOCUMENTS

| | | | |
|---|---|---|---|
| 8,209,840 B2* | 7/2012 | Norton | B23B 31/1071 |
| | | | 279/134 |
| 8,992,113 B2* | 3/2015 | Campagna | B25J 15/04 |
| | | | 403/349 |
| 9,180,527 B2* | 11/2015 | Haimer | B23B 31/113 |
| 2013/0014617 A1* | 1/2013 | Kafka | B25B 13/06 |
| | | | 81/125 |
| 2013/0316591 A1* | 11/2013 | White | H01R 13/4367 |
| | | | 439/660 |
| 2015/0270650 A1* | 9/2015 | Bower | H01R 13/405 |
| | | | 439/607.02 |

* cited by examiner

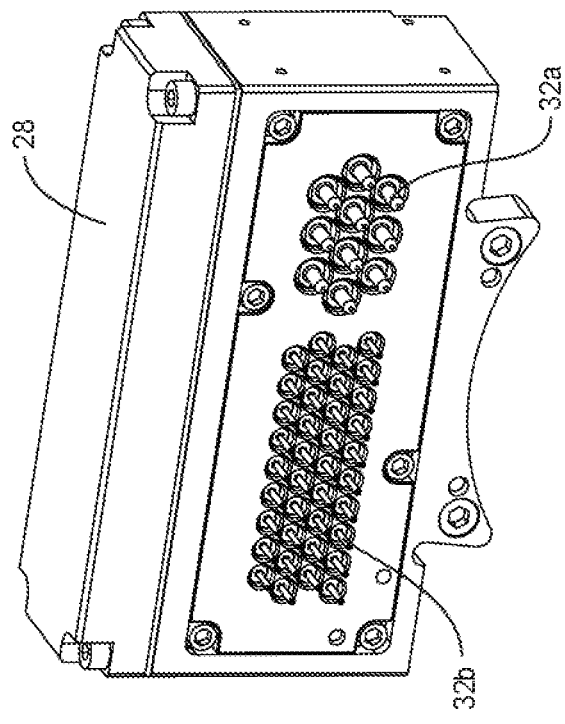
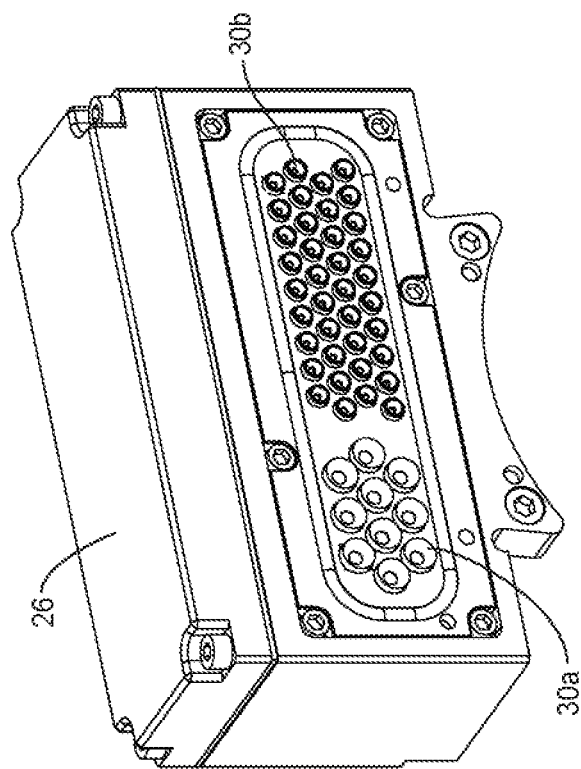
FIG. 2

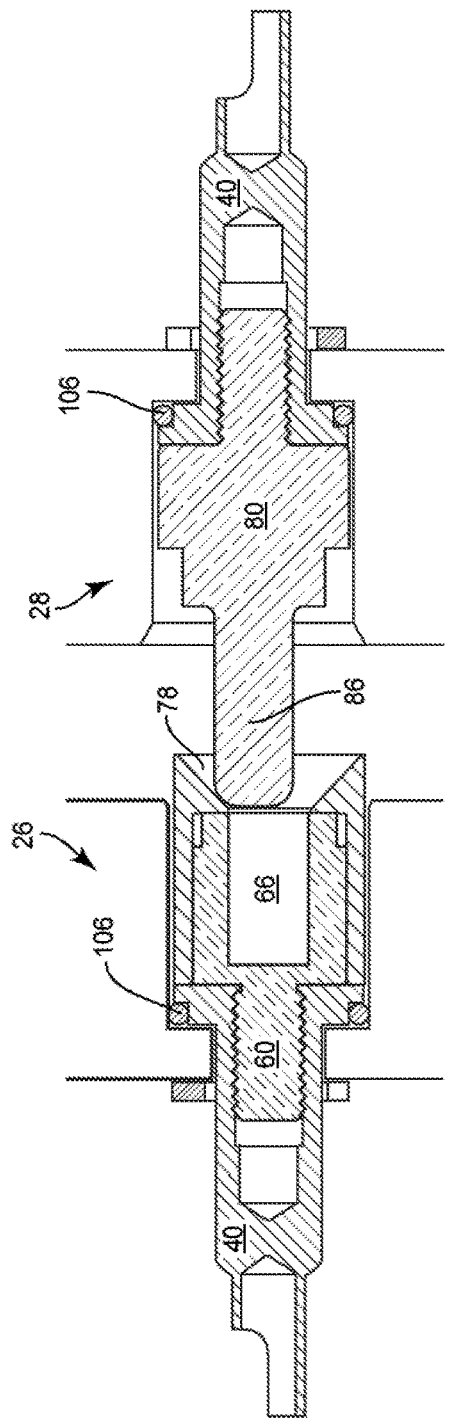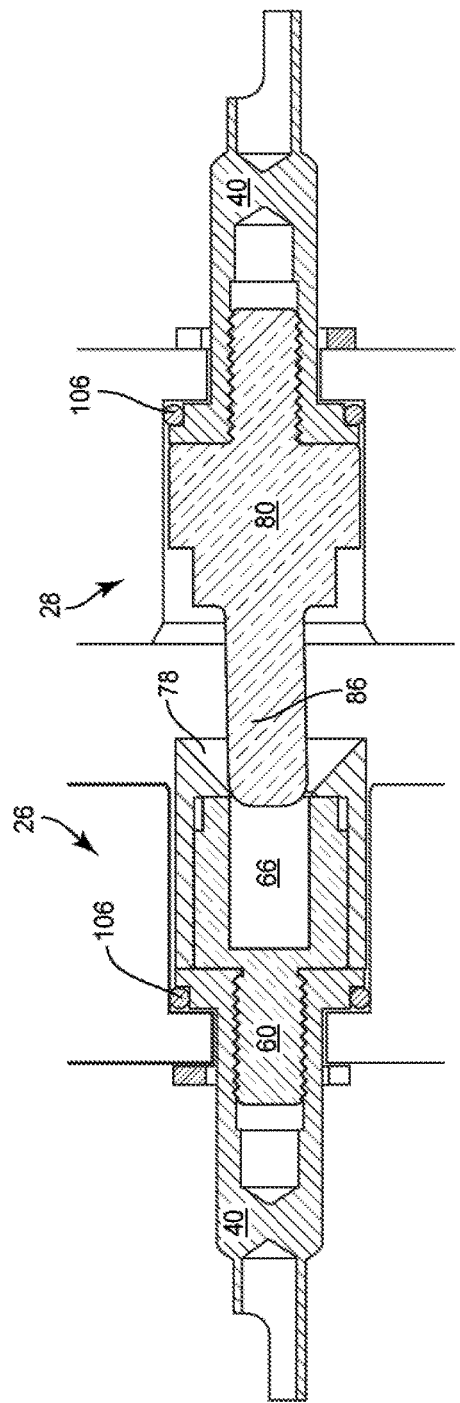

MODULAR PIN AND SOCKET ELECTRICAL CONNECTOR ASSEMBLY

FIELD OF INVENTION

The present invention relates generally to robotic tool changers, and in particular to a modular pin and socket electrical connection module.

BACKGROUND

Industrial robots have become an indispensable part of modern manufacturing. Whether transferring semiconductor wafers from one process chamber to another in a cleanroom or cutting and welding steel on the floor of an automobile manufacturing plant, robots perform many manufacturing tasks tirelessly, in hostile environments, and with high precision and repeatability.

In many robotic manufacturing applications, it is cost-effective to utilize a relatively generic robot to accomplish a variety of tasks. For example, in an automotive manufacturing application, a robot may be utilized to cut, grind, or otherwise shape metal parts during one production run, and perform a variety of spot welding tasks in another. Different welding tool geometries may be advantageously mated to a particular robot to perform welding tasks at different locations or in different orientations. In these applications, a tool changer is used to mate different tools to the robot. One half of the tool changer, called the master module, is permanently affixed to a robot arm. The other half, called the tool module, is affixed to each tool that the robot may utilize. When the robot arm positions the master module adjacent the tool module connected to a desired tool, a coupler is actuated that mechanically locks the master and tool modules together, thus affixing the tool to the end of the robot arm. Tool changers and their constituent couplers are well known in the robotics arts, and are commercially available, such as from the assignee, ATI Industrial Automation of Apex, N.C.

In many robotic applications, it is advantageous to pass utilities—such as electrical current, air pressure, hydraulic fluid, cooling water, electronic or optical data signals, and the like—from the robot arm to an attached tool, and/or vice versa. To accommodate the wide variety of such utilities, a modular approach is known, whereby the two constituent halves of a utility-passing mechanism are removeably attached to the respective master and tool modules of a robotic tool changer. To facilitate a variety of such utility modules, the tool changer modules include one or more "shelves," having a standardized shape and dimension, formed at the sides of each of the master and tool modules. Utility modules conforming to the mechanical standard may be attached as required. The modules include interface elements, such as electrical pin connections, self-sealing pneumatic valves, and the like, to pass utilities across the module interface when the two halves abut as the master and tool modules couple together.

One type of utility module commonly attached to robotic tool changers is a module to pass electrical power and/or electrical data signals. In particular, one known type of electrical connection comprises spring-loaded pins, which contact corresponding conductive plates when the modules halves abut. The springs biasing the pins forward ensure contact with the conductive plates. These modules rely on guide pins and corresponding receiving holes to precisely align the modules prior to the pins and plates making physical (and hence electrical) contact. However, in practice, the modules are often misaligned in any (or multiple) of several axes. This results in not all electrical contacts making electrical connection at the same time. Also, the exposed conductive plates (which are usually the "hot" side of the interface, at least for power delivery) are exposed, presenting both a shock hazard and a short circuit hazard.

The Background section of this document is provided to place embodiments of the present invention in technological and operational context, to assist those of skill in the art in understanding their scope and utility. Approaches descried in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a modular approach to an electrical power and/or signal passing utility module is presented. A universal receptacle is fixedly disposed in bores in both of first and second signal connector blocks. A threaded socket member and a nonconductive guide bushing are installed, as needed, in receptacles in the first block, and a threaded pin member is installed in corresponding receptacles in the second block. The nonconductive guide bushing insulates the sockets, and guides pin posts into the socket as the two blocks abut. A compliant member such as an o-ring provides compliance of the socket and pin assemblies in the signal connector blocks, making the assemblies self-aligning. The socket and pin assemblies are field-replaceable by use of a simple tool.

One embodiment relates to a modular electrical connector assembly operative to be mounted to a robotic tool changer and to complete electrical circuits as the tool changer couples. The assembly includes first and second signal connector blocks having correspondingly positioned bores formed therein, and a receptacle fixedly disposed in at least one corresponding bore of each signal connector block. Each receptacle includes a body having a threaded bore open to a forward end of the body, and a flange at the forward end of the body. A compliant member is disposed between the flange of each receptacle and a surface of the respective signal connector block. A threaded socket member is removeably disposed in the receptacle in the first signal connector block to form a socket assembly, and a threaded pin member is removeably disposed in the receptacle in the second signal connector block to form a pin assembly. Both the socket assembly and pin assembly are compliant due to deformation of the compliant member, so as to self-align when the first and second signal connector blocks abut.

Another embodiment relates to a receptacle operative to removeably hold an electrical pin or socket. The receptacle is operative to be disposed in a bore of an electrical signal connector block attached to a robotic tool changer. The receptacle includes a body having a generally cylindrical outer surface, and a flange at a forward end of the body. The flange is operative to contact a signal connector block surface when the receptacle is disposed in a bore of the electrical signal connector block. A chamfer is formed at the outer, rear-facing edge of the flange. The chamfer is operative to retain an o-ring forming a deformable seal between the flange and the signal connector block surface. A threaded bore is formed in the body; the bore is operative to removeably retain either of a threaded pin insert or a threaded socket insert.

Yet another embodiment relates to a robotic tool changer having an electrical connector assembly attached. The tool changer includes a master module operative to be connected to a robotic arm and a tool module operative to be connected to a robotic tool. A first signal connector block having a plurality of bores formed therein is attached to the master module, and a second signal connector block having a plurality of bores formed therein is attached to the tool module. A receptacle is fixedly disposed in at least one corresponding bore of each signal connector block. Each receptacle includes a body having a threaded bore open to a forward end of the body, and a flange at the forward end of the body. A compliant member is disposed between the flange of each receptacle and a surface of the respective signal connector block. A threaded socket member is removeably disposed in the receptacle in the first signal connector block to form a socket assembly, and a threaded pin member is removeably disposed in the receptacle in the second signal connector block to form a pin assembly. Both the socket assembly and pin assembly are compliant due to deformation of the compliant member, so as to self-align when the first and second signal connector blocks abut.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 2 shows perspective views of a first and second signal connector block of the modular electrical connector assembly.

FIGS. 9A-9D are section views depicting the mating of a pin assembly and socket assembly as signal connector blocks abut.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
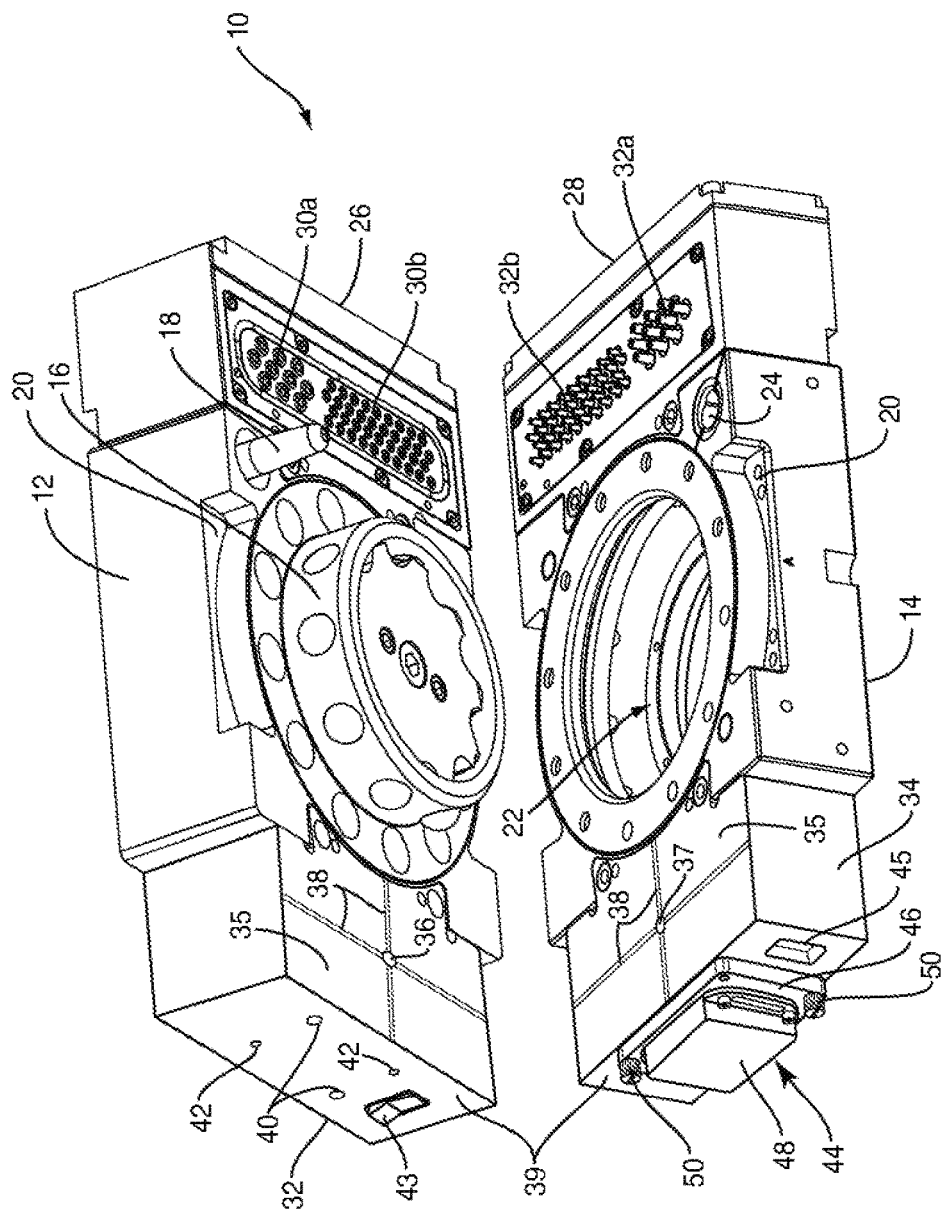
FIG. 1 is a perspective view of a robotic tool changer with an attached modular electrical connector assembly.

FIG. 1 depicts a robotic tool changer 10. The tool changer 10 comprises a master module 12 operative to be affixed to a robot arm (not shown), and a tool module 14 operative to be affixed to a robotic tool (not shown). The master module 12 includes a coupling mechanism 16, conical alignment pins 18, and a shelf 20 formed on each of four sides for the attachment of utility-passing modules. The tool module 14 includes a recess 22 to accept the coupling mechanism 16, and tapered alignment holes 24 to accept alignment pins 18. The tool module 14 also includes a shelf 20 formed on each of four sides for the attachment of utility-passing modules.

The coupling mechanism 16, in the embodiment pictured, operates by projecting balls radially outward through concentrically spaced holes. The balls contact and are urged against an annular surface within the recess 22 in the tool module 14, thus coupling the master module 12 and tool module 14 together. However, the particular coupling mechanism is not germane to a discussion of embodiments of the present invention, and could, in other embodiments, comprise any of a variety of designs.

FIG. 1 depicts a first signal connector block 26 connected to the master module 12, and a second signal connector block 28 connected to the tool module 14. The first and second signal connector blocks 26, 28, depicted separately in FIG. 2, together comprise a modular electrical connector assembly. The modular electrical connector assembly is operative to pass electrical voltage or current, and/or electrical analog or digital signals, between a robot (not shown) and an attached tool (not shown) when the master module 12 and tool module 14 of the tool changer 10 are coupled together. In the embodiment depicted in FIGS. 1 and 2, the first signal connector block 26 includes a plurality of socket assemblies 30, and the second signal connector block 28 includes a plurality of pin assemblies 32.

As explained in greater detail herein, one advantage of the socket assemblies 30 according to embodiments of the present invention is that the only portion of each socket assembly 30 that protrudes from the bore formed in the first signal connector block 26, and into which the socket assembly 30 is disposed, is a portion of a nonconductive guide bushing. In a power transfer application, power is most likely to be available on the robot and not on a tool; hence the first signal connector block 26, containing the insulated socket assemblies 30, is attached to the master module 12 to minimize any short-circuit or shock hazard. However, this is not a limitation of embodiments of the present invention. In other applications the second signal connector block 28, containing the exposed pin assemblies 32, could be attached to the master module 12, with the first signal connector block 26, containing the socket assemblies 32, being attached to the tool module 14.

FIGS. 1 and 2 depict two different sizes of socket assemblies 30—relatively larger socket assemblies 30a, which may transfer power, i.e., AC or DC voltage or current, across the tool changer 10 interface, and relatively smaller socket assemblies 30b, which may transfer signals, i.e., analog or digital signals, across the tool changer 10 interface. In one embodiment, the power socket assemblies 30a may transfer up to 25 A of current, and the signal socket assemblies 30b may transfer up to six A. The pin assemblies 32 are also depicted in two different sizes: power pin assemblies 32*a* and signal pin assemblies 32*b*. Of course, the socket assemblies 30 and pin assemblies 32 are positioned and arranged so as to mate upon the master module 12 and tool module 14 coupling together.

Figure 3:
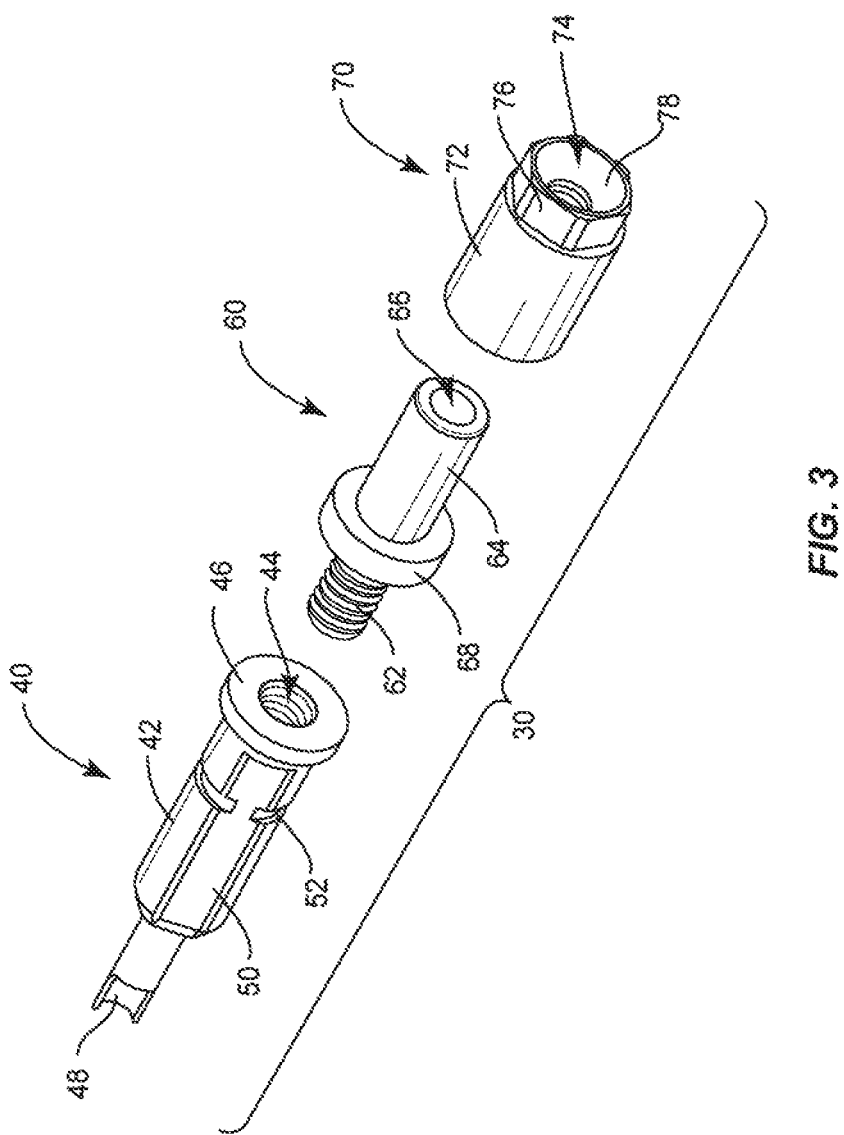
FIG. 3 is an exploded perspective view of a socket assembly according to one embodiment.

FIG. 3 depicts the constituent components of a socket assembly 30, including a receptacle 40, a threaded socket member 60, and a nonconductive guide bushing 70, according to one embodiment of the present invention. The receptacle 40 is formed of a conductive metal, such as copper or brass, and is operative to be fixedly disposed in a bore in either the first or second signal connector block 26, 28. The receptacle 40 comprises a body 42 having a threaded bore 44 formed therein and open to the forward end. As used herein, the "forward" end or direction of a socket or pin component refers to the direction in which it couples with the mating pin or socket assembly 32, 30 in use; the opposite end is referred to herein as the "rear" or "rearward" direction. At the forward end of the body 42 is a flange 46 extending radially to a greater extent than the body 42. The flange 46 is operative to contact a surface of the first or second signal connector block 26, 28 when the receptacle 40 is disposed in a bore therein. At the rear end of the receptacle 40 is a solder cup 48, operative to receive an electrical conductor and shaped so as to facilitate soldering the electrical conductor to the receptacle 40, as known in the art.

The body 42 of the receptacle 40 is generally cylindrical in shape, so as to be disposed in a bore formed in the first or second signal connector block 26, 28. To prevent rotation of the receptacle 40 in the bore as a threaded socket member 60 is threaded into or out of the bore 44, a keying feature is provided. In the embodiment depicted in FIG. 3, the keying feature comprises at least one flat surface 50 formed in the otherwise generally cylindrical outer surface of the body 42. In another embodiment, the opposite side may also have a flat surface 50. A bore in the first or second signal connector block 26, 28 includes a corresponding one or two flat surfaces. In other embodiments, a keying feature may comprise a longitudinal ridge formed along the body 42 and a corresponding groove in the connector block 26, 28 bore, or vice versa. Numerous other body 42 shapes and/or keying features may be devised by those of skill in the art, to prevent rotation of the receptacle 40 within a connector block 26, 28 bore.

A circumferential groove 52, operative to accept and retain a retaining clip, is formed in the generally cylindrical outer surface of the body 42. The circumferential groove 52 is rearward of, and in spaced relation to, the flange 46. In particular, the circumferential groove 52 is spaced from the flange 46 a distance approximately equal to the thickness of a front wall of the first or second signal connector block 26, 28, less the depth of a countersink, as described in greater detail herein.

The threaded socket member 60 comprises a threaded post 62 extending to the rear, a flange 68, and a body 64 having a smooth bore 66 open to the forward end. The threaded socket member 60 is formed of a conductive metal such as copper or brass. The threaded post 62 is sized and threaded to be removeably inserted into the threaded bore 44 of the receptacle 40. The flange 68 provides a stop, in the rearward direction, when inserting the threaded socket member 60 into the receptacle 40, as the flange 68 is positioned flush with the flange 46. The flange 68 additionally provides a base, in the forward direction, which the nonconductive guide bushing 70 contacts. The body 64 extends forward of the flange 68 and threaded post 62, and includes a smooth bore 66 open to the forward end of the threaded socket member 60. The bore 66 is operative to accept a pin post of a pin assembly 32 when the first and second signal connection blocks 26, 28 abut as the master module 12 and tool module 14 of the tool changer 10 couple together.

Disposed over the forward end of the threaded socket member 60 is a nonconductive guide bushing 70. The nonconductive guide bushing 70 has the general shape of an annular sleeve, comprising a cylindrical body 72 having a smooth bore 74 formed all the way through. The bore 74 is sized to fit over the body 64 of the threaded socket member 60. In one embodiment, the nonconductive guide bushing 70 is glued to the body 64 of the threaded socket member 60. The body 72 of the nonconductive guide bushing 70 is of sufficient length to extend from the flange 68, over the body 64, and to further extend forward of the foremost extent of the body 64, such that none of the body 64 of the threaded socket member 60 is exposed when the socket assembly 30 installed in the first or second signal connector block 26, 28.

The inner surface 78 of the forward end of the body 72 is generally concave in shape. In the embodiment depicted in FIG. 3, the inner surface 78 is conical, i.e. having a linearly decreasing diameter in a longitudinal direction from the front to the rear of the body 72. This concavity of the bore 74 at the forward end of the body 72 assists alignment and insertion of a pin post of a pin assembly 32 when the first and second signal connector blocks 26, 28 first abut, as will be explained in greater detail herein. In the embodiment depicted in FIG. 3, a flat-sided head 76 is formed on the outer surface of the forward end of the body 72. The head 76 may be polygonal, such as a hex head, although of course other shapes are possible within the scope of the present invention. The head 76 provides a known, gripable shape such that the nonconductive guide bushing 70 and threaded socket member 60 may be easily inserted into or extracted from the threaded bore 44 of the receptacle 40 by use of a wrench. Note that the keying feature of the receptacle 40, such as the flat surface 50, prevents the receptacle 40 from rotating it a bore in the first or second signal connector block 26, 28 as the nonconductive guide bushing 70 and threaded socket member 60 are inserted into or extracted from the receptacle 40.

Figure 4:
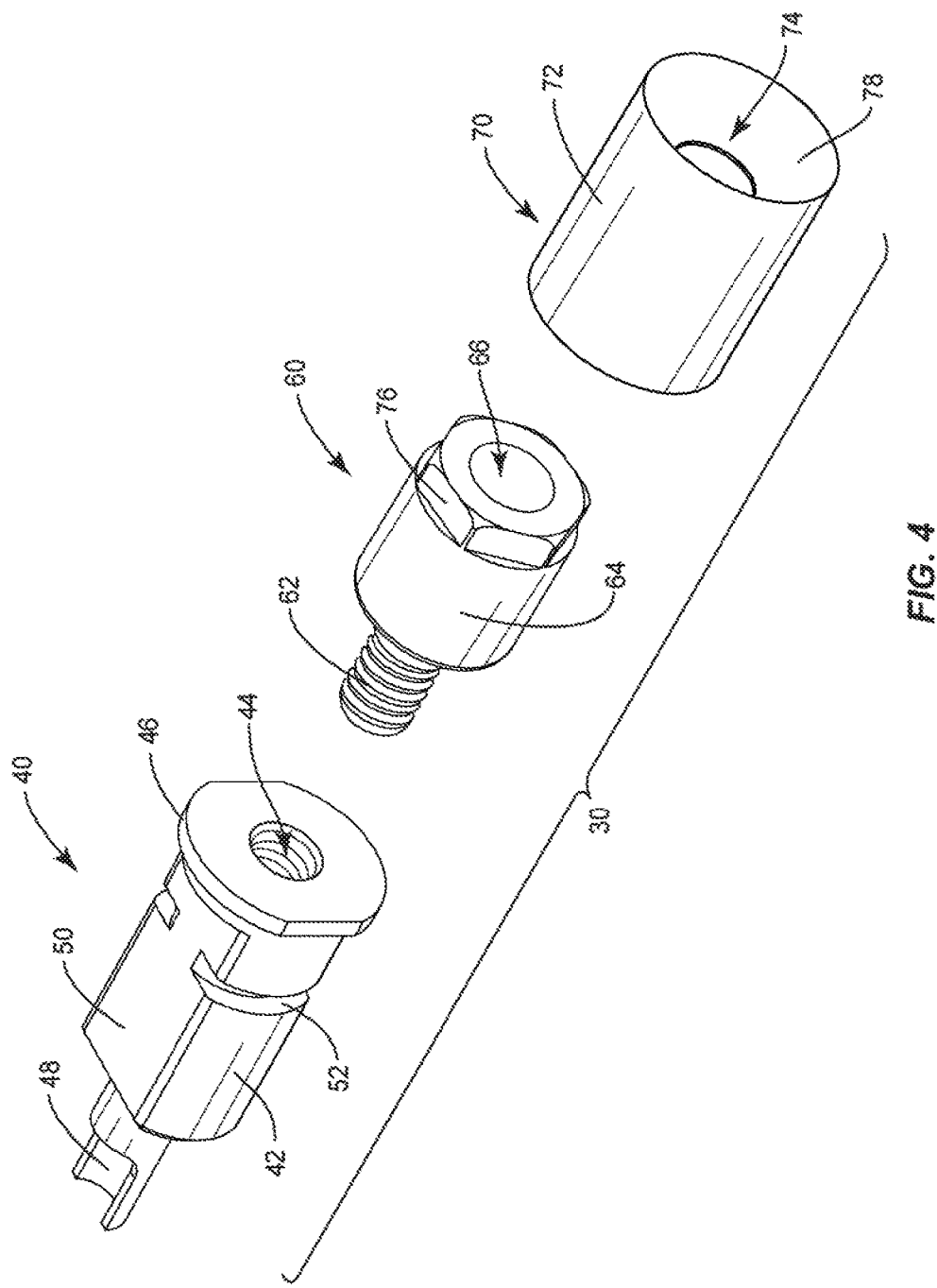
FIG. 4 is an exploded perspective view of a socket assembly according to another embodiment.

FIG. 4 depicts a socket assembly 30 according to another embodiment. In this embodiment, the receptacle is the same as described above with respect to the embodiment of FIG. 3. However, in this embodiment, on the threaded socket member 60, the flange 68 and body 64 are merged. Additionally, the flat-sided head 76 is formed in the forward end of the threaded socket member 60 rather than the nonconductive guide bushing 70. The nonconductive guide bushing 70 comprises a body 72 with a bore 74 extending all the way through, and having a generally concave (in this embodiment, conical) inner surface 78 at the forward end of the body 72. In this embodiment, the body 72 of the nonconductive guide bushing 70 is necessarily of greater diameter than that depicted in FIG. 3. However, in this embodiment, the nonconductive guide bushing 70 should not be glued to the body 64 of the threaded socket member 60. Indeed, the nonconductive guide bushing 70 should be fairly easy to remove from the body 64 of the threaded socket member 60, to expose the head 76 on the body 64.

Figure 5:
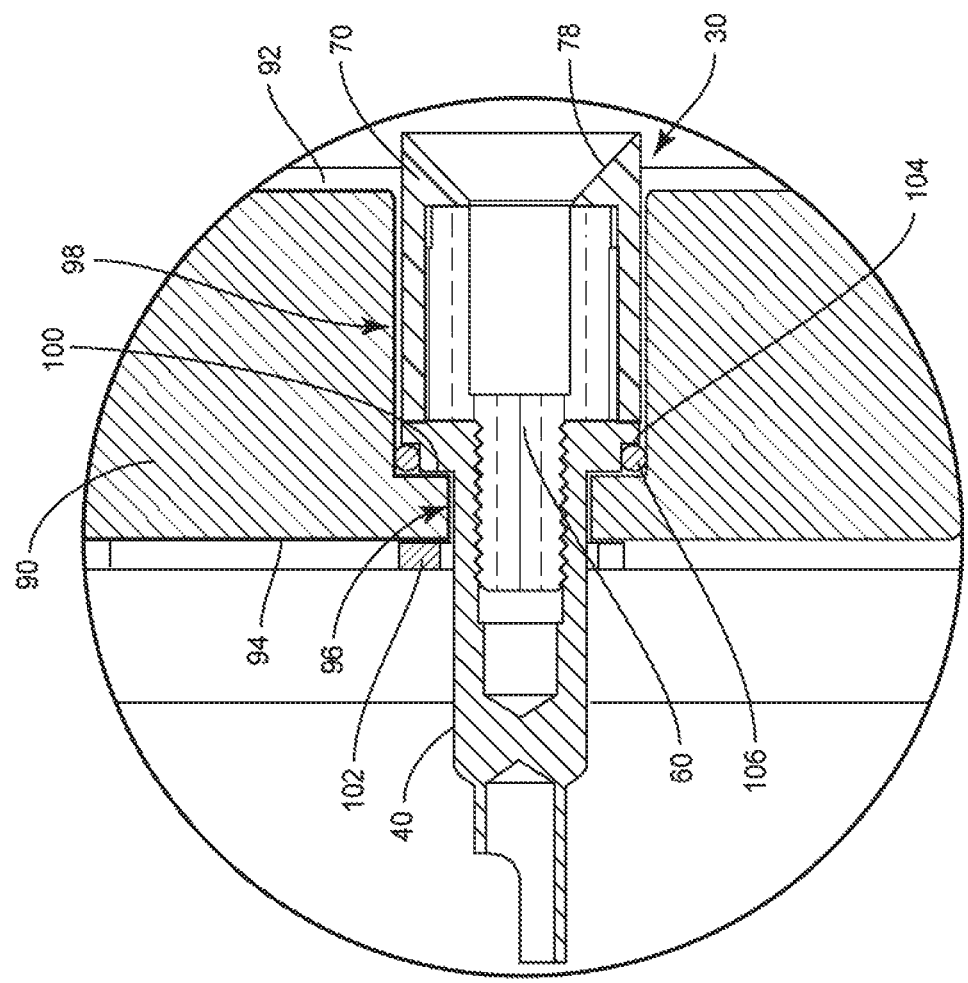
FIG. 5 is a section view of a socket assembly installed in a signal connector block.

FIG. 5 is a section view of a front wall 90 of either the first signal connector block 26 or the second signal connector block 28, with the socket assembly 30 of FIG. 4 installed therein. The front wall 90 has a forward surface 92 and a rear surface 94. The front wall 90 is formed of a dielectric material. A bore 96 is formed through the front wall 90, open to the rear surface 94. A countersink 98 connects with the bore 92, and is open to the front surface 92. At the intersection of the bore 96 and the countersink 98, an annular surface 100 is formed within the front wall 90. The front wall 90 is sized with respect to the socket assembly 30 such that when inserted, the flange 46 of the receptacle 40 contacts the annular surface 100, retarding further insertion of the receptacle 40 into the bore 96. In this position, the circumferential groove 52 in the body 42 of the receptacle 40 extends to the rear of the rear surface 94 of the wall 90. A retention clip 102 is inserted in the circumferential groove 52, fixedly securing the receptacle 40 in the bore 96. An electrical conductor may be soldered to the solder cup 48. Corresponding keying features of the body 42 (such as one or more flat surfaces 50) and the bore 96 prevent rotation of the receptacle 40 within the bore 96.

Note that in this position, the front end of the threaded socket member 60 does not extend outwardly of the front surface 92 of the wall 90, but the portion of the nonconductive guide bushing 70 having the concave inner surface 78 does. In this manner, the hazard of shock or short-circuit due to inadvertent contact with the threaded socket member 60 is virtually eliminated.

Not visible in the views of FIG. 3 or 4, but depicted in FIG. 5, is a chamfer 104 formed in the outer periphery of the rear face of the flange 46 of the receptacle 40. Prior to inserting the receptacle 40 into the countersink 98 and bore 96, a compliant member 106, such as for example an o-ring, is positioned in the chamfer 104. The o-ring 106 diameter is slightly greater than the depth of the chamfer 104, such that at least the o-ring 106, but not the full rear face of the flange 46, contacts the annular surface 100 when the receptacle 40 is inserted into the bore 96 far enough to insert a retaining clip 102 into the circumferential groove 52 to secure the receptacle 40 in the bore 96. As described more fully herein, in addition to sealing the interior of the signal connector block 26, 28 from the exterior, this allows the socket assembly 30 to exhibit some compliance within the front wall 90, due to compression and deformation of parts of the o-ring 106.

Figure 6:
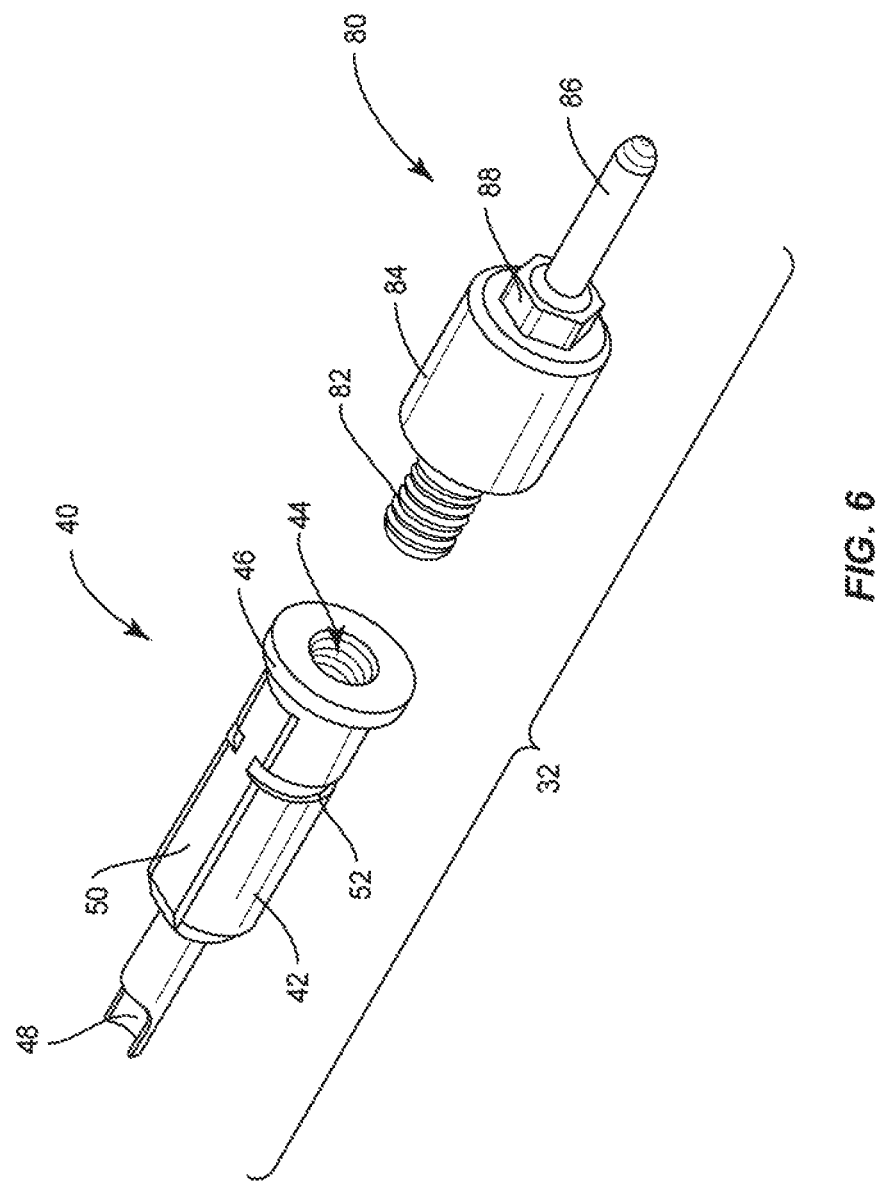
FIG. 6 is an exploded perspective view of a pin assembly according to one embodiment.

FIG. 6 depicts the constituent components of a pin assembly 32, including a receptacle 40 and a threaded pin member 80, according to one embodiment of the present invention. The receptacle 40 is the same component as described above with respect to FIGS. 3 and 4 and is hence not further elaborated. The threaded pin member 80 comprises a threaded post 82, a body 84, a pin post 86, and a flat-sided head 88 interposed between the body 84 and the pin post 86. The threaded pin member 80 is formed of a conductive metal, such as copper or brass. The head 88 may be polygonal, such as a hex head. The threaded post 82 is sized and threaded to be removeably inserted into the threaded bore 44 of the receptacle 40. The pin post 86 protrudes from the body 84 a distance corresponding to its depth of insertion into a socket assembly 30 when the first and second signal connector blocks 26, 28 abut. Accordingly, the pin post 86 is sized and shaped to form a snug fit in the bore 66 in the threaded socket member 60, to provide maximum surface contact and hence electrical conductivity.

Similarly to the head 76 described above, a flat-sided head 88 is interposed between the body 84 and the pin post 86. The flat-sided head 88 may be polygonal, such as a hex head, although of course other shapes are possible within the scope of the present invention. The head 88 provides a known, gripable shape such that the threaded pin member 80 may be easily inserted into or extracted from the threaded bore 44 of the receptacle 40 by use of a wrench. Note that the keying feature of the receptacle 40, such as the flat surface 50, prevents the receptacle 40 from rotating it a bore in the first or second signal connector block 26, 28 as the threaded pin member 80 is inserted into or extracted from the receptacle 40.

Figure 7:
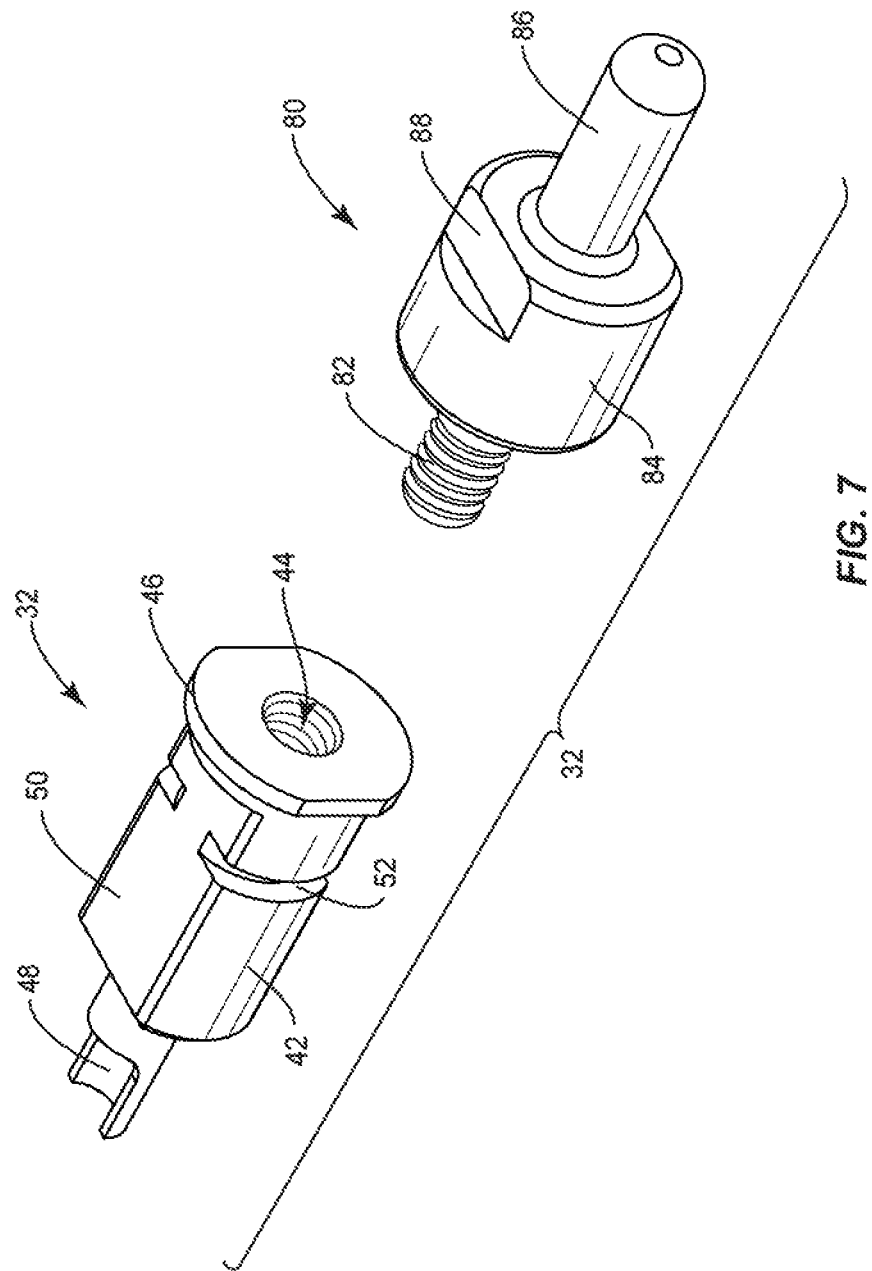
FIG. 7 is an exploded perspective view of a pin assembly according to another embodiment.

FIG. 7 depicts a pin assembly 32 according to another embodiment. In this embodiment, the receptacle is the same as described above with respect to the embodiments of FIGS. 3-5. However, in this embodiment, on the threaded pin member 80, a flat-sided head 88 comprises only two opposed flat surfaces formed in the forward end of the otherwise cylindrical outer surface of the body 84. A correspondingly-shaped wrench may be used to insert the threaded pin member 80 into, or extract it from, the threaded bore 44 of the receptacle 40.

Figure 8:
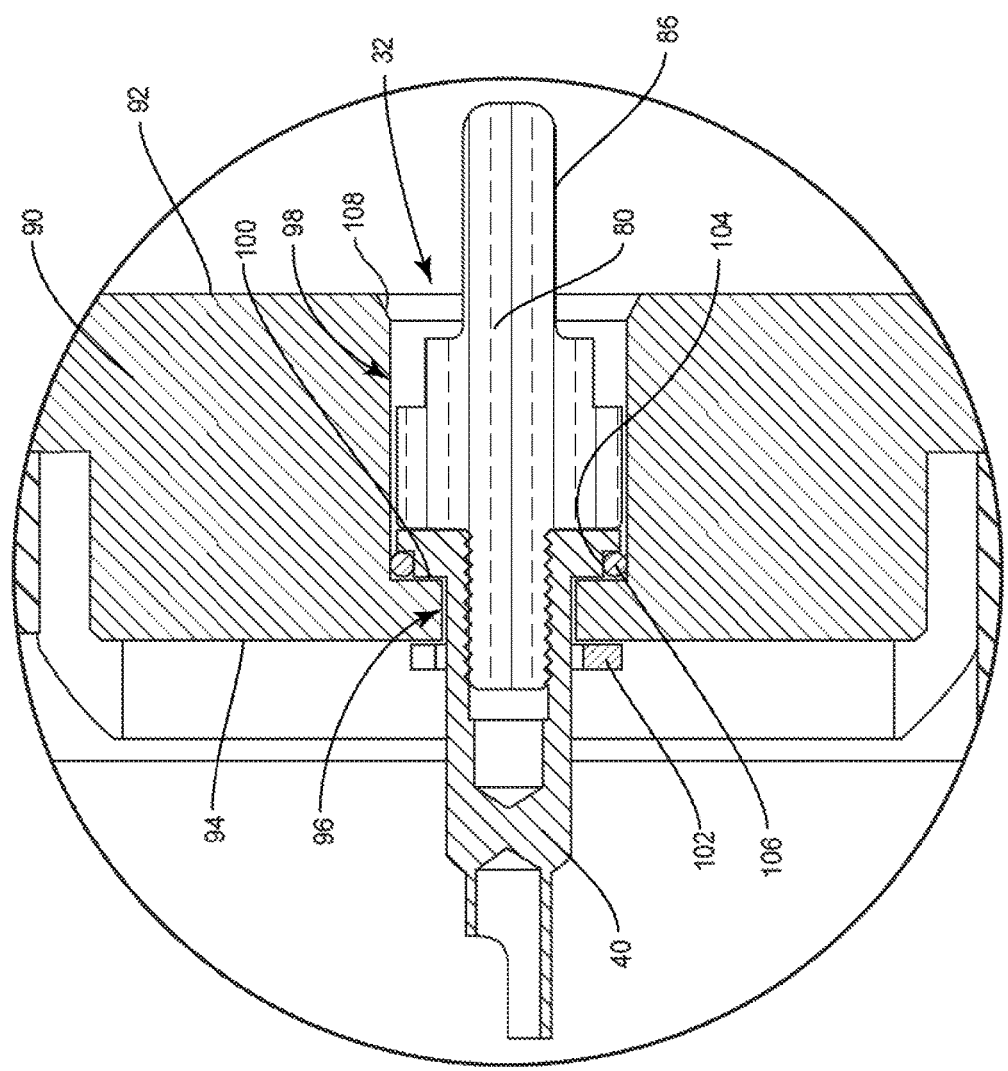
FIG. 8 is a section view of a pin assembly installed in a signal connector block.

FIG. 8 is a section view of a front wall 90 of either the first signal connector block 26 or the second signal connector block 28, with the pin assembly 32 of FIG. 7 installed therein. The front wall 90, having forward surface 92 and rear surface 94—as well as the bore 96, countersink 98, and annular surface 100—are as described above with respect to FIG. 5. Insertion and retention of the receptacle 40 in the countersink 98 and bore 96, and retention via a retention clip 102 in the circumferential groove 52, are also as previously described. A threaded pin member 80 is threaded into the receptacle 40 to form the pin assembly 32. Note that at the forward opening of the countersink 98, opening to the forward surface 92 of the wall 90, there is sufficient space between the pin post 86 and the countersink 98 walls to accept the protruding portion of a nonconductive guide bushing 70 of a socket assembly 30 when the first and second signal connector blocks 26, 28 abut. Additionally, in one embodiment a chamfer 80 is added at the interface between the countersink 98 and front surface 92 of the wall 90. As described more fully herein, the chamfer 80 may aid self-alignment of the first and second signal connector blocks 26, 28 by "catching" the protruding portion of the nonconductive guide bushing 70 of a corresponding socket assembly 30, and guiding it into the countersink 98.

In this position, the pin post 86 of the threaded pin member 80 protrudes outwardly of the front surface 92 of the wall 90, to the extent that the pin post 86 will be inserted into the bore 66 of a corresponding socket assembly 30. If the pin assembly 86 is powered when the master assembly 12 and tool assembly 14 of the robotic tool changer are decoupled and separated, a hazard of shock or short-circuit exists for inadvertent contact with the pin post 86. For this reason, in one embodiment, the second signal connector block 28, containing pin assemblies 32, is only attached to tool modules 14, as robotic tools typically do not have independent sources of electrical power, and hence cannot energize any pin assembly 86 when not connected to a robot. However, in other embodiments, the second signal connector block 28, containing pin assemblies 32, may be connected to a master module 12.

As described above, the flange 46 of the receptacle 40 has a chamfer operative to hold an o-ring 106. The o-ring seals the interior of the signal connector block 26, 28 from the exterior, and it also provides some compliance to make the pin assembly 32 and socket assembly 30 self-aligning.

FIGS. 9A-D depict the self-alignment feature of embodiments of the present invention as the first signal connector block 26 and second signal connector block 28 come together, as the master module 12 and tool module 14 of a tool changer 10 come together and couple. In these drawings, the socket assembly 30 of FIG. 4 and the pin assembly 32 of FIG. 7 are depicted.

Initially, as seen in FIG. 9A, both the socket assembly 30 and pin assembly 32 are aligned within their respective countersinks 98 and bores 96 in the signal connector block walls 90. However, due to a misalignment of the first signal connector block 26 and the second signal connector block 28, the pin post 86 is not aligned with the socket bore 66. Hence, the initial contact of the pin post 86 is with the convex interior surface 78 of the nonconductive guide bushing 70.

FIG. 9B shows how the convex interior surface 78 of the nonconductive guide bushing 70 acts to guide the pin post 86 into the socket bore 66 as the signal connector blocks 26, 28 move closer together. To achieve the movement of the tip of the pin post 86 downwardly (as depicted in FIG. 9B), note that the pin assembly 80 is no longer aligned within the countersink 98 and bore 96 of the second signal connector block 28. The canting of the pin assembly 80 is enabled by compressing the lower portion of the o-ring 106. Note further that the upper portion of the o-ring 106 no longer contacts the annular surface 100. In this case, the pin assembly 80 is effectively pivoting about the lower portion of the o-ring 106, as well as compressing that portion of the o-ring 106.

Figure 9C:
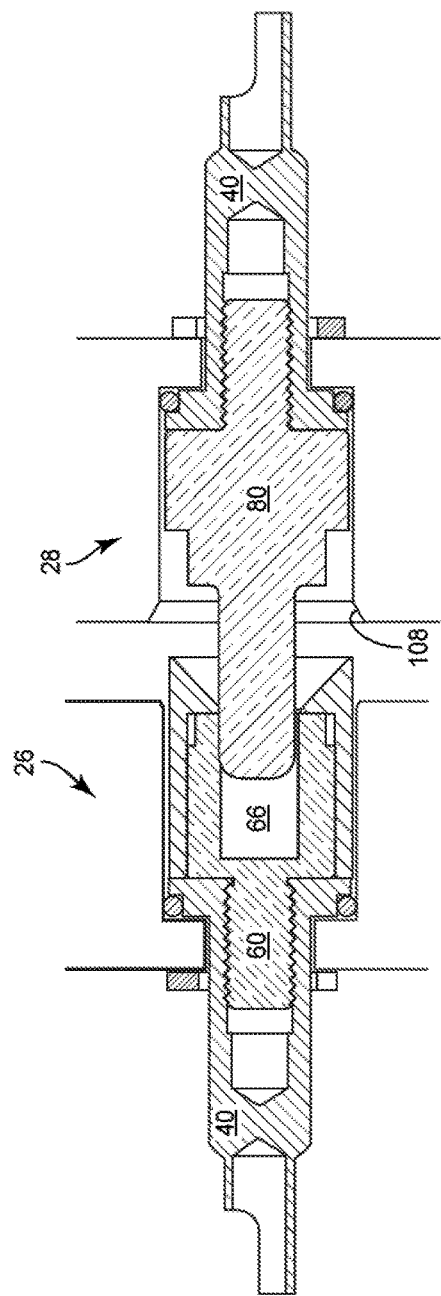

FIG. 9C depicts the pin post 86 inserted further into the socket bore 66, causing the socket assembly 30 to pivot on the upper portion of its o-ring 106. Within the wall 90 of the first signal connector block 26, space exists between the lower flange 46 and the annular surface 100 of the wall 90, as well as between the lower portion of the outer surface of the nonconductive guide bushing 70 and the lower inner wall of the countersink 98. Also evident in this view is that the protruding portion of the nonconductive guide bushing 70 of the socket assembly 30 is not aligned with the countersink 98 in the second signal connector block 28. The nonconductive guide bushing 70 will, rather, contact the chamfer 108, which will guide the socket assembly 30 into the countersink 98, as depicted in FIG. 9D.

Figure 9D:
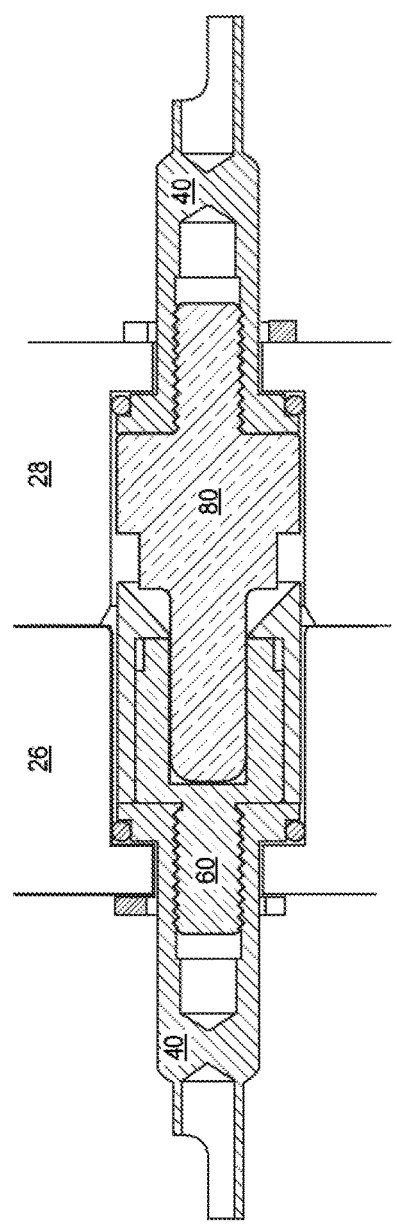

FIG. 9D depicts the first and second signal connector blocks 26, 28 fully abutting, with the pin post 86 fully inserted into the socket bore 66. Even though the signal connector blocks 26, 28 are still not fully aligned, the pin assembly 32 and socket assembly 30 are able to fully mate and provide complete electrical contact, due to their compliance within the respective countersinks 98 and bores 96 in the walls 90. Note also that the protruding portion of the nonconductive guide bushing 70 is contained within the space in the countersink 98 of the second signal connector block 28, around the pin post 86. In one embodiment, chamfer 108 is formed at the interface of the front surface 92 of the wall 90 and the countersink 98 opening, to guide the nonconductive guide bushing 70 into the countersink 98 in the case of misalignment between the first and second signal connector blocks 26, 28.

According to embodiments of the present invention, both the first signal connector block 26 and the second signal connector block 28 are fully populated, with receptacles 40 installed in all bores 96. Then, depending on the specific electrical power and/or signal passing requirements of a particular tool in a particular application, the necessary number of socket assemblies 30 and corresponding pin assemblies 32 may be inserted into the respective receptacles 40 to prepare the first and second signal connector blocks 26, 28 for use with that tool for that application. This modularity, and the flexibility it enables, present significant advantages over electrical power/signal transfer utility modules of the prior art. Only a few modular electrical connector assemblies (each comprising first and second signal connector blocks 26, 28) of different sizes need to be manufactured/purchased, stocked, and maintained. Power/signal passing utility modules customized to each tool and application may then be assembled using an appropriately-sized modular electrical connector assembly, and only populating it with the necessary number and arrangement of socket assemblies 30 and pin assemblies 32.

Embodiments of the present invention present numerous advantages over electrical power/signal passing utility modules of the prior art. As compared to the spring-loaded pin designs, the pin and socket configuration results in lower contact resistance (due to greater contact surface area); the pins are self-cleaning; and the design has inherently greater resistance to both vibration and contamination. As discussed above, the modular design allows for a reduction in inventory, as only a few signal connector blocks of different sizes are required to implement a broad array of numbers and configurations of signal-passing modules, by selectively installing pin assemblies 32 and socket assemblies 30 only as needed. The use of the same receptacle 40 to hold both threaded socket members 60 and threaded pin members 80 reduces the number of unique components and hence reduces costs. Furthermore, the threaded socket members 60 and threaded pin members 80 are easily field-replaceable by the user, by simply unscrewing a damaged socket or pin member 60, 80 using a wrench, and re-installing a new one. The nonconductive guide bushing 70 both insulates the possibly "hot" socket conductors, avoiding a shock or short-circuit hazard, and also guides pin posts 82 into the socket bore 66 in the case of misalignment, minimizing damage to the components. As discussed above with reference to FIGS. 9A-D, the pin and socket assemblies 32, 30 are self-aligning and can automatically accommodate a significant degree of misalignment between the signal connector blocks 26, 28.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A modular electrical connector assembly operative to be mounted to a robotic tool changer and to complete electrical circuits as the tool changer couples, comprising:
    first and second signal connector blocks having correspondingly positioned bores formed therein;
    a receptacle fixedly disposed in at least one corresponding bore of each signal connector block, each receptacle comprising
        a body having a threaded bore open to a forward end of the body; and
        a flange at the forward end of the body;
    a compliant member disposed between the flange of each receptacle and a surface of the respective signal connector block;
    a threaded socket member comprising a threaded post removeably disposed in the threaded bore of the receptacle in the first signal connector block to form a socket assembly;
    a threaded pin member comprising a threaded post removeably disposed in the threaded bore of the receptacle in the second signal connector block to form a pin assembly; and wherein both the socket assembly and pin assembly are compliant due to deformation of the compliant members, so as to self-align when the first and second signal connector blocks abut.

2. The assembly of claim 1 wherein the compliant member is an o-ring.

3. The assembly of claim 2 wherein a chamfer is formed at the outer, rear-facing edge of each flange, and wherein the o-ring is disposed in the chamfer.

4. The assembly of claim 1 wherein each signal connector block surface abutting a flange is a countersunk surface.

5. The assembly of claim 1 wherein the socket assembly further comprises a nonconductive guide bushing covering at least a portion of the threaded socket member protruding from the receptacle.

6. The assembly of claim 5 wherein an inner surface of a forward end of the nonconductive guide bushing has a generally concave shape, and is operative to guide a corresponding pin into the socket as the first and second signal connector blocks abut.

7. The assembly of claim 6 wherein the inner surface has a conical shape.

8. The assembly of claim 5 wherein one of the threaded socket member and the nonconductive guide bushing includes a polygonal, flat-sided head formed on a forward end and operative to be rotated by a wrench to removeably dispose the threaded socket member in the receptacle.

9. The assembly of claim 1 wherein the threaded pin member further comprises pin post and a generally cylindrical body between the threaded post and the pin post.

10. The assembly of claim 1 wherein the threaded pin member further comprises a polygonal, flat-sided head interposed between the body and the male connector pin post, the head operative to be rotated by a wrench to removeably dispose the threaded pin member in the receptacle.

11. The assembly of claim 1 wherein each receptacle has a generally cylindrical outer surface.

12. The assembly of claim 11 wherein each receptacle further comprises a keying feature on the body operative to mate with a corresponding feature in the bore of the electrical signal connector block, to prevent rotation of the receptacle within the bore.

13. The assembly of claim 12 wherein the keying feature comprises at least one flat surface in the otherwise generally cylindrical outer surface.

14. The assembly of claim 1 wherein each receptacle further comprises a solder cup at a rear end of the body operative to receive an electrical conductor.

15. The assembly of claim 1 wherein each receptacle further comprises a circumferential groove formed in the body, reward of and in spaced relation to the flange, the assembly further comprising:
a retaining clip disposed in each groove and operative to retain the receptacle forward of the groove and rearward of the flange in the bore in the respective signal connector block.

16. The assembly of claim 1 wherein the receptacle, threaded socket member, and threaded pin member are conductive, and wherein the first and second signal connector blocks are dielectric.

17. A receptacle operative to removeably hold an electrical pin or socket, the receptacle operative to be disposed in a bore of an electrical signal connector block attached to a robotic tool changer, comprising:
a body having a generally cylindrical outer surface;
a flange at a forward end of the body operative to contact a signal connector block surface when the receptacle is disposed in a bore of the electrical signal connector block;
a chamfer formed at the outer, rear-facing edge of the flange, the chamfer operative to retain an o-ring forming a deformable seal between the flange and the signal connector block surface;
a threaded bore formed in the body and operative to removeably retain either of a threaded pin member having a threaded post or a threaded socket member having a threaded post.

18. The receptacle of claim 17 further comprising a solder cup at a rear end of the body operative to receive an electrical conductor.

19. The receptacle of claim 17 further comprising a circumferential groove formed in the body in spaced relation to the flange, the groove operative to hold a retaining clip when the receptacle is disposed in the bore of the electrical signal connector block.

20. The receptacle of claim 17 further comprising a keying mechanism on the body operative to mate with a corresponding feature in the bore of the electrical signal connector block, to prevent rotation of the receptacle within the bore.

21. The receptacle of claim 20 wherein the keying mechanism comprises at least one flat surface in the otherwise generally cylindrical outer surface.

22. The receptacle of claim 17 wherein the signal connector block surface is a countersunk surface.

23. A robotic tool changer having an electrical connector assembly attached, comprising:
a master module operative to be connected to a robotic arm;
a tool module operative to be connected to a robotic tool;
a first signal connector block having a plurality of bores formed therein attached to the master module;
a second signal connector block having a plurality of bores formed therein attached to the tool module;
a receptacle fixedly disposed in at least one corresponding bore of each signal connector block, each receptacle comprising
a body having a threaded bore open to a forward end of the body; and
a flange at the forward end of the body;
a compliant member disposed between the flange of each receptacle and a surface of the respective signal connector block;
a threaded socket member comprising a threaded post removeably disposed in the threaded bore of the receptacle in the first signal connector block to form a socket assembly;
a threaded pin member comprising a threaded post removeably disposed in the threaded bore of the receptacle in the second signal connector block to form a pin assembly; and
wherein both the socket assembly and pin assembly are compliant due to deformation of the compliant members, so as to self-align when the first and second signal connector blocks abut.

24. The tool changer of claim 23 wherein the compliant member is an o-ring.

25. The tool changer of claim 24 wherein a chamfer is formed at the outer, rear-facing edge of each flange, and wherein the o-ring is disposed in the chamfer.

26. The tool changer of claim 23 wherein each signal connector block surface abutting a flange is a countersunk surface.

27. The tool changer of claim 23 wherein the socket tool changer further comprises a nonconductive guide bushing covering at least a portion of the threaded socket member protruding from the receptacle.

28. The tool changer of claim 27 wherein an inner surface of a forward end of the nonconductive guide bushing has a generally concave shape, and is operative to guide a corresponding pin into the socket as the first and second signal connector blocks abut.

29. The tool changer of claim 28 wherein the inner surface has a conical shape.

30. The tool changer of claim 27 wherein one of the threaded socket member and the nonconductive guide bushing includes a polygonal, flat-sided head formed on a forward end and operative to be rotated by a wrench to removeably dispose the threaded socket member in the receptacle.

31. The tool changer of claim 23 wherein the threaded pin member further comprises pin post and a generally cylindrical body between the threaded post and the pin post.

32. The tool changer of claim 23 wherein the threaded pin member further comprises a polygonal, flat-sided head interposed between the body and the male pin post, the head operative to be rotated by a wrench to removeably dispose the threaded pin member in the receptacle.

33. The tool changer of claim 23 wherein each receptacle has a generally cylindrical outer surface.

34. The tool changer of claim 33 wherein each receptacle further comprises a keying feature on the body operative to mate with a corresponding feature in the bore of the electrical signal connector block, to prevent rotation of the receptacle within the bore.

35. The tool changer of claim 34 wherein the keying feature comprises at least one flat surface in the otherwise generally cylindrical outer surface.

36. The tool changer of claim 23 wherein each receptacle further comprises a solder cup at a rear end of the body operative to receive an electrical conductor.

37. The tool changer of claim 23 wherein each receptacle further comprises a circumferential groove formed in the body, reward of and in spaced relation to the flange, the tool changer further comprising:
    a retaining clip disposed in each groove and operative to retain the receptacle forward of the groove and rearward of the flange in the bore in the respective signal connector block.

38. The tool changer of claim 23 wherein the receptacle, threaded socket member, and threaded pin member are conductive, and wherein the first and second signal connector blocks are dielectric.

\* \* \* \* \*